US012569799B2

(12) United States Patent
Deichsel et al.

(10) Patent No.: US 12,569,799 B2
(45) Date of Patent: Mar. 10, 2026

(54) GAS TREATMENT PROCESS AND PROCESS ARRANGEMENT

(71) Applicant: Linde GmbH, Pullach (DE)

(72) Inventors: Florian Deichsel, Pullach (DE); Thomas Ried, Pullach (DE); Gabriel Salazar Duarte, Pullach (DE); Martin Pottmann, Pullach (DE); Verena Kramer, Pullach (DE); Emilie Duval, Pullach (DE); Georg Förster, Pullach (DE)

(73) Assignee: Linde GmbH, Pullach (DE)

( * ) Notice: Subject to any disclaimer, the term of this patent is extended or adjusted under 35 U.S.C. 154(b) by 346 days.

(21) Appl. No.: 18/554,588

(22) PCT Filed: Apr. 11, 2022

(86) PCT No.: PCT/EP2022/025141
§ 371 (c)(1),
(2) Date: Oct. 9, 2023

(87) PCT Pub. No.: WO2022/218572
PCT Pub. Date: Oct. 20, 2022

(65) Prior Publication Data
US 2024/0189758 A1       Jun. 13, 2024

(30) Foreign Application Priority Data
Apr. 13, 2021     (EP) ..................................... 21020203

(51) Int. Cl.
*B01D 53/02*       (2006.01)
*B01D 53/04*       (2006.01)
*C10L 3/10*        (2006.01)

(52) U.S. Cl.
CPC .......... *B01D 53/0462* (2013.01); *C10L 3/101* (2013.01); *B01D 2259/4006* (2013.01); *B01D 2259/65* (2013.01); *C10L 2290/542* (2013.01)

(58) Field of Classification Search
CPC ...... B01D 2256/245; B01D 2257/7022; B01D 2259/4006; B01D 2259/403;
(Continued)

(56) References Cited

U.S. PATENT DOCUMENTS

| | | | |
|---|---|---|---|
| 4,954,146 A * | 9/1990 | Garrett | ............... B01D 53/0438 95/96 |
| 2013/0192299 A1 | 8/2013 | Dolan et al. | |

(Continued)

FOREIGN PATENT DOCUMENTS

| | | |
|---|---|---|
| EP | 2854989 A1 | 4/2015 |
| WO | 2013/116627 A1 | 8/2013 |

*Primary Examiner* — Christopher P Jones
(74) *Attorney, Agent, or Firm* — Millen, White, Zelano & Branigan, P.C.; Brion P. Heaney

(57)       ABSTRACT

The present invention proposes a gas treatment process in which a process arrangement comprising three process units is used, the gas treatment process comprising subsequently operating a different one of the three process units in a heating mode during a heating phase, the heating mode comprising heating a first gas stream to a first temperature level using a first heat exchanger, introducing the first gas stream at the first temperature level to the process unit which is operated in the heating mode, withdrawing a second gas stream from the process unit which is operated in the heating mode, and thereafter cooling the second gas stream to a second temperature level using a second heat exchanger.

12 Claims, 4 Drawing Sheets

(58) Field of Classification Search
CPC ............ B01D 2259/65; B01D 53/0462; C10L
2290/54; C10L 2290/542; C10L 3/101;
Y02C 20/40
See application file for complete search history.

(56) References Cited

U.S. PATENT DOCUMENTS

2015/0308734 A1    10/2015  Bauer
2021/0053008 A1*    2/2021  Ried .................. B01D 53/0438

* cited by examiner

GAS TREATMENT PROCESS AND PROCESS ARRANGEMENT

The present invention relates to a gas treatment process and to a corresponding process arrangement according to the preambles of the independent claims.

BACKGROUND OF THE INVENTION

As generally known and as e.g. described in US 2015/308734 A1 of the present applicant, liquefaction and sub-cooling of hydrocarbon-rich gas mixtures like natural gas is typically performed using at least one pure refrigerant cycle and/or at least one mixed refrigerant cycle. In the context of gas liquefaction, clogging of process equipment, which can be caused by solidification ("freezing") of certain components, particularly of so-called heavy hydrocarbons, must be avoided.

In the field of natural gas liquefaction, heavy hydrocarbons are generally defined as hydrocarbons comprising six or more carbon atoms such as hexanes and higher, and these may also include, according to the definition used herein, hydrocarbons with five carbon atoms. Heavy hydrocarbons typically also include aromatic compounds, particularly benzene, toluene and xylene (BTX). The present invention particularly relates to the treatment of gas mixtures containing such heavy hydrocarbons besides lighter hydrocarbons, particularly methane. Such gas mixtures may also contain hydrocarbons with two to four carbon atoms, particularly ethane, propane, butane, isobutane, and pentane. The latter are also referred to as natural gas liquids. Hydrocarbons with five carbon atoms may, according to the present invention, be part of (unwanted) heavy hydrocarbons to be removed from a corresponding gas mixture, but they may also be considered to represent hydrocarbons to be transferred into a purified gas mixture.

Particularly, the present invention relates to treatment of natural gas but is not limited thereto. The present invention may be used in the context of other gas mixtures with the same or similar properties as just described in connection with hydrocarbon-rich gas. However, the present invention may also be used in treating other gas mixtures in which unwanted components are present, particularly mixtures such as air wherein unwanted components may include water and hydrocarbons or mixtures such as synthesis gas from steam reforming where unwanted components may likewise include water, etc. Typically, the unwanted components are condensable without using cryogenic temperatures. Corresponding gas mixtures may also include carbon dioxide as an unwanted component which may be removed using other means such as physical or chemical scrubbing technologies and the like at an appropriate position of the process.

Generally, the present invention is usable in all applications where a gas mixture comprises components that may be removed by adsorption processes. Only for illustration purposes, the further description will focus on hydrocarbon-rich gas mixtures. For example, the purification of air to be processed in a cryogenic air separation unit, including a removal of water and carbon dioxide by adsorption using zeolithes, is described in H.-W. Häring (Ed.), Industrial Gases Processing, Wiley-VCH, 2006, particularly Section 2.2.5, "Cryogenic Rectification".

While unwanted components such as water may typically be removed from hydrocarbon-rich gas mixtures to be liquefied, if present, at ambient temperatures to a sufficient extent, heavy hydrocarbons are classically removed by subjecting the gas mixture to be liquefied to an initial partial condensation, causing heavy hydrocarbons to liquefy. These heavy hydrocarbons are then removed as a heavy hydrocarbon fraction.

Such a partial condensation as described can be realized with different process steps such as refrigeration, expansion, absorption or, particularly in natural gas treatment, cryogenic absorption. If the hydrocarbon-rich gas mixture to be liquefied comprises a sufficiently high content of components with an intermediate boiling range, for example propane, butane and/or pentane, which during cooling of the gas mixture also undergo a sufficient liquefaction and thus effectively act as a solvent for the heavy hydrocarbons to be removed. Particularly in so-called lean natural gas, such components are only present in small amounts, and a sufficient depletion by partial condensation via cryogenic absorption is generally not possible.

For several reasons, processes including an adsorptive removal of heavy hydrocarbons from hydrocarbon-rich gas mixtures have been proposed as an alternative to partial condensation, particularly for treating lean natural gases.

For example, WO 2013/116627 A1 discloses a process for removing heavy hydrocarbons from a natural gas stream which comprises passing the natural gas stream through a temperature swing adsorption unit to adsorb heavy hydrocarbons and water, regenerating the temperature swing adsorbent by heating to form a contaminated gas phase, cooling the contaminated gas phase to separate water and heavy hydrocarbon liquids to form a further gas phase, and directing the further gas phase to a pressure swing adsorption unit to adsorb heavy hydrocarbons from the third gas phase. The product from the pressure swing adsorption unit can be sent to a pipeline or recycled to the temperature swing adsorption unit.

State of the art adsorptive removal of heavy hydrocarbons and water requires considerable amounts of energy during regeneration. In addition, some existing adsorption process schemes cause a highly fluctuating energy demand during regeneration. It is therefore an object of the present invention to increase the efficiency in the removal of heavy hydrocarbons from hydrocarbon-rich gas mixtures using temperature swing adsorption.

Disclosure of the Invention

Against this background, the present invention proposes a gas treatment process and a corresponding process arrangement comprising the features of the independent claims. Advantageous embodiments of the present invention are the subject of the dependent claims and of the description that follows.

Before turning to specific advantages and features of the present invention, some terms and processes used in this connection will be further explained.

A gas mixture used in forming a feed gas stream according to the present invention may particularly be a hydrocarbon-rich gas mixture such as natural gas and may also contain relatively high amounts of nitrogen. The gas mixture may particularly contain 0.005 to 4 mol-%, particularly 0.01 to 2 mol-%, of heavy hydrocarbons, including hydrocarbons with six, seven, eight, nine and more carbon atoms and optionally five carbon atoms as well. Heavy hydrocarbons, in the definition used herein, may particularly include benzene, toluene and/or xylol, particularly in a content from 0.0005 to 0.2 mol-%. The gas mixture may further particularly contain more than 10 ppm of water and may especially be saturated with water under the conditions used. Any or all these components may be "undesired" components according to the language used herein. The gas mixture used in forming the feed gas stream may contain 5 to 99.995 mol.-%, particularly 20 to 95 mol.-% of hydrocarbons lighter than those just mentioned. Particularly, the gas mixture used in forming the feed gas stream may contain 0.1 to 99.995 mol-%, particularly 1 to 95 mol-%, of methane and/or nitrogen. A content of hydrocarbons with two to four and optionally five carbon atoms, i.e. the lighter hydrocarbons not including methane, may particularly be in the range from 0.5 to 20 mol-%, particularly from 1 to 10 mol-%, these particularly including 0.1 to 20 mol-% of hydrocarbons with two, 0.1 to 20 mol-% of hydrocarbons with three, 0.1 to 5 mol-% of hydrocarbons with four, and 0.05 to 2 mol-% of hydrocarbons with five carbon atoms. Such lighter hydrocarbons, as well as methane and/or nitrogen, are "desired" components according to the language used herein.

In the terminology used herein, liquids and gases may be referred to as being enriched or depleted in one or more components, these terms being relative to a content in a liquid or gas from which the liquid or gas under consideration was obtained. The liquid or gas is enriched if it contains at least 1.1 times, 1.5 times, 2 times, 5 times, 10 times, 100 times or 1000 times the content, and depleted if it contains at most 0.9 times, 0.5 times, 0.1 times, 0.01 times or 0.001 times the content of a corresponding component, relative to the liquid or gas it was derived from.

The present application uses the terms pressure level and temperature level to characterize pressures and temperatures, the purpose of which is to express that pressures and temperatures need not be used in the form of exact pressure or temperature values in order to realise the concept of the present invention and embodiments thereof. However, such pressures and temperatures are typically within certain ranges around an average, mean or set value. Corresponding pressure levels and temperature levels may be in disjoint ranges or in ranges that overlap. In particular, pressure levels include unavoidable pressure losses. The same applies to temperature levels. The pressure levels indicated herein in bar units are considered to be absolute pressures. For example, the feed gas mixture treated according to the present invention may be provided at a pressure level in a range of e.g. 20 to 100 bar, with a fluctuation margin of e.g. up to 5 bar.

Temperature swing adsorption (TSA) is, as generally known, an adsorptive process for the separation of gas mixtures in which the adsorbent used is regenerated using thermal energy. Temperature swing adsorption is used, for example, for waste gas purification or for processing gas mixtures such as, like in the present invention, natural or synthesis gas. Other gas mixtures can also be separated in a corresponding manner by means of thermal swing adsorption, for example gas mixtures such as biogas or waste gases from chemical or physical gas scrubbing processes such as rectisol or amine scrubbing, provided that their composition is suitable for the separation. The present invention is not limited to the use of certain adsorbents or gas mixtures, provided that they fall under the scope of the independent claims. Examples of gas mixtures treatable accordingly were already given above.

Temperature swing adsorption makes use of the temperature dependence of adsorption processes. For adsorbing certain components of a gas mixture, a stream formed from the gas mixture, which hereinafter is also referred to as an "adsorption gas stream" or "fifth gas stream", is passed over an adsorbent accommodated in a container or "adsorption vessel" which hereinafter is also synonymously referred to as an "adsorption unit", an adsorption vessel being one type of process unit usable according to the present invention.

Adsorption is performed at a lower temperature level in a phase also referred to as an "adsorption phase" hereinbelow with respect to the specific adsorption vessel. A corresponding operation mode is referred to as an "adsorption mode", i.e. during the adsorption phase the adsorption unit is operated in an adsorption mode. As a consequence of the adsorption, the adsorbent is loaded with the adsorbing components to be separated from adsorption gas stream.

In a subsequent phase, the adsorbent is started to be regenerated by desorbing the adsorbed components by heating, i.e. by introducing thermal energy. This phase is also referred to as the "heating phase" hereinbelow. A corresponding operation mode is referred to as a "heating mode".

After the heating phase, to complete regeneration, the adsorption vessel needs to be cooled, in order to be prepared for being operated in a subsequent adsorption phase.

In the context of the description herein, this phase is referred to as a "cooling phase", and the corresponding operation mode is referred to as a "cooling mode".

The heating phase and the cooling phase together form a phase also being referred to as a "regeneration phase", a "regeneration" thus including operating the corresponding adsorption vessel in the heating mode and thereafter the cooling mode.

For the continuous operation of a temperature swing adsorption apparatus, conventionally at least two adsorption vessels are required, such that the gas mixture to be treated may always be passed through at least one of the adsorption vessels, and the present invention uses at least three adsorption vessels operated accordingly. This does not necessarily mean that there are only phases in which exactly one adsorption vessel is used for adsorption. Rather, phases may be present in which two or more adsorption vessels, particularly in larger arrangements, can be operated in an adsorption mode. The adsorption gas stream may thus be subsequently passed through different adsorption vessels, allowing the other adsorption vessels to be regenerated.

Temperature swing adsorption can be used in particular in systems with components that have high adsorption affinities. The durations of the explained phases, particularly the adsorption phase, are usually several hours. Temperature swing adsorption is generally used to remove low concentrated components in gas mixtures and is typically less suitable for removing higher concentrated components.

In temperature swing adsorption, in other words, a suitable gas stream which is hereinafter referred to as a "heating gas stream" or "first gas stream" is passed in the heating phase in heated form directly over the adsorbent. The heating gas stream desorbs and absorbs the components previously adsorbed to the adsorbent, forming a loaded gas stream which is referred to as "second gas stream" hereinbelow. The gas used for the heating gas stream can conventionally be a purified process product, for example steam or nitrogen. However, the heating gas stream does not have to include a purified product. Usage of other gases is possible, like for example a portion of the feed gas. In a further alternative, which is realized in to the present invention, and which is customary in the field, gas which was previously introduced as a cooling gas stream ("third gas stream" hereinbelow) and which is thus withdrawn from an adsorption vessel operated in a cooling mode in the form of a corresponding gas stream ("fourth gas stream" hereinbelow) is used for regeneration, i.e. as the "first gas stream". Subsequent to a heating phase, a cooling phase is present, in order to prepare the adsorbent for use in subsequent adsorption phase, the outflow of which may then be used for regenerating a different adsorption vessel in the manner described. For being used as a heating gas stream, the first gas stream must be heated and the second gas stream must thereafter be cooled for being recycled to the process.

Features and Advantages of the Invention

For removal of unwanted components from a gas mixture with a temperature swing adsorption vessel, a process scheme such as shown in FIG. 1 is common. Reference is made to the explanations below, and the corresponding reference numerals are used here. As shown in FIG. 1, a cooler and a heater are provided in such a scheme.

The heater (E1, also referred to as "process gas heater") is used for heating the heating gas stream to the required regeneration gas temperature (also referred to as "high temperature level", usually above 250° C. or above 200° C. and up to 350° C.) and a cooler (E2, "process gas cooler") is used for cooling the hot heating gas loaded with the desorbed components to a temperature at which these components at least partially condense ("low temperature level", usually below 40° C. or below 30° C. and down to a hydrate formation or freezing temperature, e.g. 0° C.).

The heater E1 is typically provided as a fired heater in classical arrangements but may also comprise one or more heat exchanger vessels, an arrangement of a heat exchanger and a heater with direct firing, etc. The cooler may e.g. be provided as an air cooler. Hereinbelow, and in the context of the present invention, the heater E1 and the cooler E2 are provided as or including heat exchangers and are for this reason referred to as "first heat exchanger" and "second heat exchanger".

Due to the operation of the process, the inlet temperatures to the heater and the cooler fluctuate significantly between the low and the high temperature level in classical arrangements. This is because the inlet temperature to the heater E1 is the outlet temperature of the adsorber vessel during a cooling phase (Step C1 shown in FIG. 4, to which reference is made here as well), and the inlet temperature to the cooler E2 is the outlet temperature of the adsorber vessel during the heating phase (Step H1 shown in FIG. 4).

As can be seen from FIG. 4, at the beginning of the heating phase, the outflow from the corresponding adsorption vessel ("second gas stream") is still low, as colder gas still contained in the adsorption vessel from the preceding adsorption phase is driven out from it. This means that at the beginning of the heating phase, not much cooling is necessary for the second gas stream, as compared to a later phase when the hot gas leaves the adsorption vessel. Correspondingly, an outflow from an adsorption vessel which is operated in the cooling phase ("fourth gas steam") is still warm at the beginning of the cooling phase, as initially warmer gas from the preceding heating phase is contained therein and driven out therefrom. That is, at the beginning of the cooling phase, not much heating is necessary for providing the first (heating) gas stream, as compared to a later time.

Therefore, for both the heater and the cooler E1 and E2 the temperature difference between inlet and outlet can temporarily raise to 250° C. or even higher, which results in a significant energy demand. Furthermore, the fluctuating inlet temperatures are challenging for the design of the heater and the cooler, particularly if the heater E1 is provided as a direct fired heater and the cooler E2 is provided as an air cooler.

This invention introduces a new concept for a secondary heat transfer fluid system that enables high energy recovery and therefore a much more efficient process with lower energy demand. The application of such a secondary heat transfer fluid system is not limited to the temperature swing adsorption process shown in FIG. 1 but can be applied for other applications with similar boundary conditions.

Generally, the present invention relates to a gas treatment process in which a process arrangement comprising three process units is used. It should be understood that the process arrangement may comprise more than the three process units mentioned, in which case the explanations in connection with the heating, cooling, and adsorption modes below may apply to more than one adsorption unit, respectively.

According to the present invention, the gas treatment process comprises subsequently operating a different one of the three process units (A, C, G; reference numerals and corresponding designations such as E1 and E2 are used hereinbelow in correspondence with the Figures for clarity reasons but are entirely optional) in a heating mode during a heating phase. The heating mode comprises heating a first gas stream to a first temperature level using a first heat exchanger E1, introducing the first gas stream at the first temperature level to the process unit which is operated in the heating mode, withdrawing a second gas stream from the process unit which is operated in the heating mode, and thereafter cooling the second gas stream to a second temperature level using a second heat exchanger E2.

A specific embodiment relating to a temperature swing adsorption process is further explained below. Explanations relating to a gas treatment process are equally applicable to a corresponding process arrangement and vice versa. Repeated explanations are omitted for reasons of conciseness only.

Particularly, according to the present invention, a heat amount transferred in the first and the second heat exchanger E1 and E2 is changing over time, wherein a minimum heat amount transferred may generally be 10%, 20%, 30%, 40%, 50%, 60%, 70% or 80% of a maximum heat amount, respectively. The heat amount transferred in the first and the second heat exchanger E1 and E2 changes so much because of fluctuation of the inlet temperatures, that is the first gas stream and the second gas stream. They particularly change in unison, "in unison" meaning that a temperature decrease (of the first gas stream introduced into the first heat exchanger E1 and increase (of the second gas stream introduced into the second heat exchanger E2) is observed at substantially the same time and over substantially the same time period, such as shown in an example in FIGS. 3A and 3B, wherein "substantially the same" means a shift of no more than 5%, 10% or 20%.

According to the present invention, the first heat exchanger E1 and the second heat exchanger E2 are operated in fluidic integration into a heat transfer arrangement (which is part of the process arrangement) which is operated using a heat transfer fluid. The heat transfer arrangement further comprises a heat transfer fluid heater E3 operated with a suitable heating medium, such as mentioned below, a first buffer vessel B1, a heat transfer fluid cooler E4 operated with a suitable cooling medium, such as mentioned below, and a second buffer vessel B2.

According to the present invention, an outlet of the heat transfer fluid heater E3 is operated in permanent fluidic connection with an inlet of the first buffer vessel B1, an outlet of the first buffer vessel B1 is, particularly via a first pump P1, operated in permanent fluidic connection with an inlet of the first heat exchanger E1, an outlet of the heat transfer fluid cooler E4 is operated in permanent fluidic connection with an inlet of the second buffer vessel B2, and an outlet of the second buffer vessel B2 is, particularly via a second pump P2, operated in permanent fluidic connection with an inlet of the second heat exchanger E2.

In other words, the heat transfer arrangement according to the present invention comprises two heat exchangers, a transfer fluid heater and a transfer fluid cooler, two heat transfer fluid buffer vessels (one on a high temperature level and one on a low temperature level), as well as pumps and valves that are interconnected in a specific way. The first heat exchanger E1 is used as a process gas heater performing a heat exchange between the process gas, i.e. the first gas stream, and hot heat transfer fluid, the second heat exchanger E2 is used as a process gas cooler performing a heat exchange between the process gas, i.e. the second gas stream, and cold heat transfer fluid, the heat transfer fluid heater E3 performs a heat exchange between the heat transfer fluid and an external heat source and the heat transfer fluid cooler E4 performs a heat exchange between heat transfer fluid and an external heat sink. Herein, the terms "hot" and "cold", as used for the heat transfer fluid, may particularly indicate a temperature level of 100 to 400° C., particularly from 200 to 350° C. and of 10 to 50° C., particularly from 15 to 40° C., respectively.

According to the present invention, in a first connection mode (including formation of streams M1 as shown in FIG. 2, the first connection mode therefore also being referred to as M1 for short without limitation) an outlet of the first heat exchanger E1 is operated in temporary (i.e. throughout the first connection mode) fluidic connection with an inlet of the heat transfer fluid heater E3 while an outlet of the second heat exchanger E2 is operated in temporary (i.e. throughout the first connection mode) fluidic connection with an inlet of the heat transfer fluid cooler E4. In a second connection mode (including the formation of the stream M2 as shown in FIG. 2, therefore also referred to as M2 for short, but without limitation) according to the present invention, the outlet of the first heat exchanger E1 is operated in temporary (i.e. throughout the second connection mode) fluidic connection with the inlet of the heat transfer fluid cooler E4 while an outlet of the second heat exchanger E2 is operated in temporary (i.e. throughout the second connection mode) fluidic connection with an inlet of the heat transfer fluid heater E3.

An operation in "permanent fluidic connection" shall be understood herein as an operation comprising a fluidic connection which is present over the first and second connection mode in a like manner, while an operation in "temporary fluidic connection" shall be understood as an operation comprising a fluidic connection which is individually restricted to the respective connection mode (and preferably present throughout this connection mode) but not present in the other connection mode.

That is, according to the present invention there are two different paths provided in which the heat transfer fluid can flow, corresponding to the first and the second connection mode M1 and M2. The direction of the flow is determined by suitable means such as valves, particularly three-way valves.

In the first connection mode M1, heat transfer fluid leaving the first heat exchanger E1 is passed to the heat transfer fluid heater E3 and heat transfer fluid leaving the second heat exchanger E2 is passed to the heat transfer fluid cooler E4. In the second connection mode, on the other hand, heat transfer fluid leaving the first heat exchanger E1 is passed to the heat transfer fluid cooler E4 and heat transfer fluid leaving the second heat exchanger E2 is passed to the heat transfer fluid heater E3. As such, in the first connection mode M1, hot and cold heat transfer fluid loops are closed, respectively. This means that the hot heat transfer fluid heats up the process gas, i.e. the first gas stream, and is afterwards routed to the heat transfer fluid heater E3 to be heated up again. The heated heat transfer fluid is then introduced into the first buffer vessel B1 which may be operated at a hot temperature level according to the definition already given above.

Similarly, in the first connection mode M1, the cold heat transfer fluid is passed to the second heat exchanger E2 to cool down the process gas, i.e. the second gas stream. Afterwards, the heat transfer fluid, which has removed heat from the process gas, is passed to the heat transfer fluid cooler E4 to cool down the heat transfer fluid which is thereafter sent to the second buffer vessel B2 which may be operated at a cold temperature level according to the definition above.

In the second connection mode M2, in contrast, both the hot and the cold heat transfer fluid loops are open or interconnected. This means that the heat transfer fluid leaving the first heat exchanger E1 is passed to the heat transfer fluid cooler E4 and is subsequently sent to the cold buffer, i.e. the second buffer vessel B2, and that heat transfer fluid leaving the second heat exchanger E2 is passed to the heat transfer fluid heater E3 and is subsequently sent to the hot buffer, i.e. the first buffer vessel B1.

As mentioned already, the heat transfer fluid is preferably transferred from the first buffer vessel B1 to the inlet of the first heat exchanger E1 using a first pump P1 and the heat transfer fluid is preferably transferred from the outlet of the second buffer vessel B2 to the inlet of the second heat exchanger E2 using a second pump P2.

In the present invention, one of the first connection mode and the second connection mode is selected on the basis of a heat amount transferred in the first heat exchanger E1 and the second heat exchanger E2 by a control unit and using fluid control devices such as suitable valves. This is further explained below in connection with an embodiment of the present invention including a temperature swing adsorption process but is equally usable in connection with other embodiments.

The gas treatment process according to the present invention, as already indicated above, comprises three process units. While said one of the three process units H is operated in the heating mode during the heating phase, a further one of the three process units C is preferably operated in a cooling mode during a cooling phase and a yet further one of the three process units A is preferably operated in an adsorption mode during an adsorption phase, each of the process units A, C, H preferably being cyclically operated in the heating mode, the cooling mode and the adsorption mode. However, this does not exclude that further operation modes, phases or operation pauses are present.

In the gas treatment process according to an embodiment of the present invention, in the cooling phase or mode, a third gas stream (i.e. a cooling gas stream in the example of temperature swing adsorption) is introduced into the process unit operated in the cooling mode and a fourth gas stream is withdrawn from the process unit operated in the cooling mode.

In the adsorption phase or mode, a fifth gas stream (i.e. a gas mixture to be subjected to an adsorption process in the example of temperature swing adsorption) is introduced into the process unit operated in the adsorption mode and a sixth gas stream (a purified gas mixture in the example of temperature swing adsorption) is withdrawn from the process unit in the adsorption mode.

The third gas stream is, according to the present invention, particularly formed by using a part of a feed gas stream supplied to the gas treatment process, the first gas stream is particularly formed using at least a part of the fourth gas stream, the fifth gas stream is particularly formed using a further part of the feed gas stream F and a part of the second gas stream cooled to the second temperature level, and a product gas stream which is withdrawn from the gas treatment process is particularly formed using at least a part of the sixth gas stream. This operation is particularly further explained in relation to FIG. 1 below.

In the case of a temperature swing adsorption process, a temperature swing adsorption arrangement is used as the process arrangement, the temperature swing adsorption arrangement comprising at least three adsorption vessels as the at least three process units, the at least three adsorption vessels each containing one or more adsorbents.

In this case, the fifth gas stream comprises at least one undesired component and at least one desired component, the at least one undesired component being at least in part adsorbed to the adsorbent(s) in the adsorption vessel in the adsorption mode such that the sixth gas stream is depleted in the at least one undesired component and is enriched in the at least one desired component.

In the heating mode the at least one undesired component is in such an embodiment at least in part desorbed from the adsorbent(s) contained in the adsorption vessel which is operated in the heating mode using the first gas stream as a heating gas stream, such that the second gas stream contains at least a part of the at least one undesired component. In the cooling mode in such an embodiment the third gas stream is used as a cooling gas stream with which the adsorbent is cooled. The at least one undesired component is particularly at least one heavy hydrocarbon according to the definition used herein when natural gas or a gas mixture derived therefrom is used in forming the feed gas stream. The desired component is particularly methane and/or nitrogen and/or at least one light hydrocarbon as defined above.

According to a preferred embodiment of the present invention, the first temperature level is a hot temperature level and the second temperature level is a cold temperature level according to the definition given above.

In the embodiment just explained, during a first time period during the heating phase (or each of the heating phases), the first connection mode M1 is selected and during a second time period subsequent to the first time period during the heating phase (or each of the heating phases), the second connection mode M2 is selected.

The decision which connection mode is used depends, as mentioned, on the heat that is transferred in the first heat exchanger E1 and the second heat exchanger E2. In the early part of the heating phase, the inlet temperatures to the first heat exchanger E1 and the second heat exchanger E2 are close to the outlet temperatures and not much heat has to be transferred. That is, because for the formation of the first (heating) gas stream a fourth gas stream withdrawn from a different adsorption vessel which is operated in the cooling mode is used. In the early part of the cooling phase, the gas leaving the adsorption vessel operated in the cooling mode, i.e. the fourth gas stream, is still hot such that not much further heat is needed to obtain the first temperature level, as already mentioned. Also, in the early part of the heating phase, the gas leaving the adsorption vessel operated in the heating mode (i.e. the second gas stream) is still cold, such not much further cooling is needed, as mentioned as well. Consequently, the temperature of the heat transfer fluid is only moderately changed in the first and second heat exchanger E1 and E2 and it is efficient to heat the heat transfer fluid leaving the first heat exchanger E1 up to the high temperature level again and to cool the heat transfer fluid leaving the second heat exchanger E2 down to the low temperature level again. That is, the first connection mode is preferably selected. In the late part of a temperature swing adsorption cycle, the situation changes. That is, because the gas leaving the adsorption unit operated in the cooling mode becomes cold and the gas leaving the adsorption vessel operated in the heating mode becomes hot. Therefore, the temperature of the heat transfer fluid is changed significantly in the first and second heat exchanger. It is more efficient to cool the heat transfer fluid leaving the first heat exchanger E1 down to the low temperature level and heat the heat transfer fluid leaving the second heat exchanger E2 up to the high temperature level. That is, the second connection M2 mode is preferably selected in such a time period.

The connection modes are preferably changed on the basis of a temperature level of the second gas stream withdrawn from the adsorption vessel that is operated in the heating mode and/or a temperature level of the fourth gas stream withdrawn from the adsorption vessel that is operated in the cooling mode. In a specific embodiment, a change is made as soon as the temperature of the process gas, i.e. the second gas stream, exiting the adsorption unit operated in the heating mode is higher than the temperature of the process gas, i.e. the fourth gas stream, exiting the adsorption vessel that is operated in the cooling mode.

With regard to the process arrangement provided according to the present invention, reference is made to the corresponding claim.

As to further features and specific advantages of the arrangement according to the present invention, reference is made to the explanations of the inventive method and its embodiments above. This also applies to an arrangement according to a particularly preferred embodiment of the present invention which comprises means adapted to perform a corresponding method.

In the method and in the arrangement of the present invention, the following features can be realized in order to provide further improvements:

1. To increase the efficiency of the removal of heavy hydrocarbons, a Joule Thomson valve can be used.
2. To increase the efficiency of the of the removal of heavy hydrocarbons, a chiller unit can be used.
3. To increase the efficiency of the of the removal of heavy hydrocarbons, a heavy oil wash unit can be used.
4. For the adsorptive removal of heavy hydrocarbons an improved silica gel may be used. The invention is not limited to this material, other materials with high capacity for such compounds can also be used, e.g. alumina gel, activated carbon, zeolites or a combination of these materials.
5. Internally insulated vessels can be used to further decrease the energy demand.
6. The present invention is not limited to feedstocks coming from wells. Other feedstocks containing heavy hydrocarbons can also be used.
7. The present invention can be used for natural gas feedstocks or feedstocks containing high amounts of nitrogen, but is not limited to these gases
8. The present invention can also be used for natural gas conditioning for the production of liquefied natural gas.

9. The present invention is not limited to a process involving three adsorption vessels.

10. The heat transfer fluid can be any fluid typically used or generally usable for heat transfer, e.g. thermal oil, water, etc.

The present invention is further described with reference to the appended drawings illustrating embodiments of the present invention.

SHORT DESCRIPTION OF THE FIGURES

Figure 1:
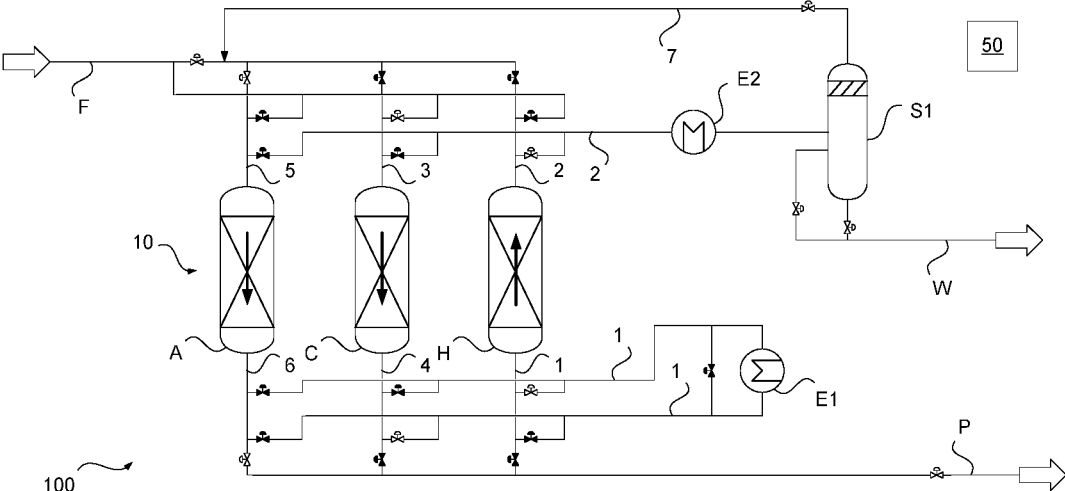
FIG. 1 illustrates a gas treatment process usable in connection with the present invention in the form of a simplified process flow diagram.

In the Figures, elements of identical or comparable construction and/or function are indicated with identical reference numerals and are not repeatedly explained for reasons of conciseness. Explanations relating to methods and steps thereof shall equally apply to apparatus adapted to carry out such method.

EMBODIMENTS OF THE INVENTION

The embodiments of the present invention illustrated hereinbelow are described with reference to a hydrocarbon-rich gas mixture being used as the feed gas mixture, the hydrocarbon-rich gas mixture comprising heavy hydrocarbons with at least five or six carbon atoms and/or water as the unwanted components. The explanations, however, also apply to other unwanted components and gas mixtures, as mentioned.

FIG. 1 illustrates a gas treatment process 100 usable in connection with the present invention in the form of a simplified process flow diagram.

The process 100 is a process for removal of heavy hydrocarbons with at least five or six carbon atoms from a hydrocarbon-rich feed gas mixture by temperature swing adsorption. A temperature swing adsorption arrangement 10 is used as a process arrangement, the temperature swing adsorption arrangement 10 comprising three adsorption vessels or adsorption units A, C, H, preferably of identical construction, as process units. The at least three adsorption vessels A, C, H each contain a suitable adsorbent.

The temperature swing adsorption arrangement 10 is operated by a control unit schematically illustrated with a block 50. FIG. 1 shows a snapshot of the operation of the temperature swing adsorption arrangement 10. In FIG. 1, a plurality of valves is shown, of which closed valves are symbolized by a black filling while open valves are symbolized by a transparent filling.

In the embodiment shown, a different one of the three adsorption vessels A, C, H is subsequently operated in a heating mode during a heating phase. In the snapshot of FIG. 1 this is the adsorption vessel H. Simultaneously, further one of the three adsorption vessels A, C, H is operated in a cooling mode during a cooling phase. In the snapshot of FIG. 1 this is the adsorption vessel C. Simultaneously, a yet further one of the three process units A, C, H is operated in an adsorption mode during an adsorption phase. In the snapshot of FIG. 1 this is the adsorption vessel A. Each of adsorption vessels A, C, H is cyclically operated in the heating mode, the cooling mode and the adsorption mode, as explained.

In the temperature swing adsorption arrangement 100, a first gas stream 1 is heated to a first temperature level using a first heat exchanger E1 which is conventionally typically a fired heater, and the first gas stream 1 is then introduced at the first temperature level to the adsorption vessel H (in the snapshot shown in FIG. 1), and a second gas stream 2 is withdrawn from the adsorption vessel H (in the snapshot shown in FIG. 1). The second gas stream 2 is cooled to a second temperature level using a cooler E2.

The cooling mode comprises introducing a third gas stream 3 to the adsorption vessel operated in the cooling mode, which is the adsorption vessel C in FIG. 1, and withdrawing a fourth gas stream 4 from the adsorption vessel C operated in the cooling mode. The adsorption mode comprises introducing a fifth gas stream 5 to the adsorption vessel operated in the adsorption mode, which is adsorption vessel A in FIG. 1, and withdrawing a sixth gas stream 6 from the adsorption vessel A operated in the adsorption mode.

The third gas stream 3 is formed by using a part of the feed gas stream F supplied to the gas treatment process 100, the first gas stream 1 is formed by using at least a part of the fourth gas stream 4, the fifth gas stream 5 is formed using a further part of the feed gas stream F and at least a part of the second gas stream 2 cooled to the second temperature level, and a product gas stream P withdrawn from the gas treatment process 100 is formed using least a part of the sixth gas stream 6.

The second gas stream 2 cooled to the second temperature level contains components desorbed from an adsorbent in the adsorption unit in the heating mode, i.e. adsorption unit H in the snapshot of FIG. 1, which may be removed in a stripper column S1 or a knockout vessel. The knocked out components may be withdrawn in the form of a liquid stream W and a remainder gas stream 7, which is recycled, can be used in forming the fifth gas stream 5.

The fifth gas stream 5 particularly comprises at least one undesired component (particularly heavy hydrocarbons) and at least one desired component (lighter hydrocarbons) which were introduced with the feed gas stream F, the at least one undesired component being at least in part adsorbed to the adsorbent in the adsorption vessel which is operated in the adsorption mode, which is the adsorption unit A in the snapshot of FIG. 1, such that the sixth gas stream 6 is depleted in the at least one undesired component and is enriched in the at least one desired component. In the heating mode the at least one undesired component is at least in part desorbed from the adsorbent contained in the adsorption vessel which is operated in the heating mode, i.e. adsorption unit H in the snapshot of FIG. 1, using the first gas stream as a regeneration gas stream, such that the second gas stream contains at least a part of the at least one undesired component. In the cooling mode, the third gas stream is used as a cooling gas stream with which the adsorbent contained in the adsorption vessel which is operated in the cooling mode, i.e. unit C in the snapshot of FIG. 1, is cooled.

A direction of the gas flows through the adsorption vessels, C, H is indicated with arrows. As mentioned, in a subsequent operation cycle of the adsorption vessels A, C, H is switched using the valves. Generally, the directions can be reversed but preferably adsorption and cooling are performed in the same direction and heating is performed in a direction opposite thereto.

Figure 2:
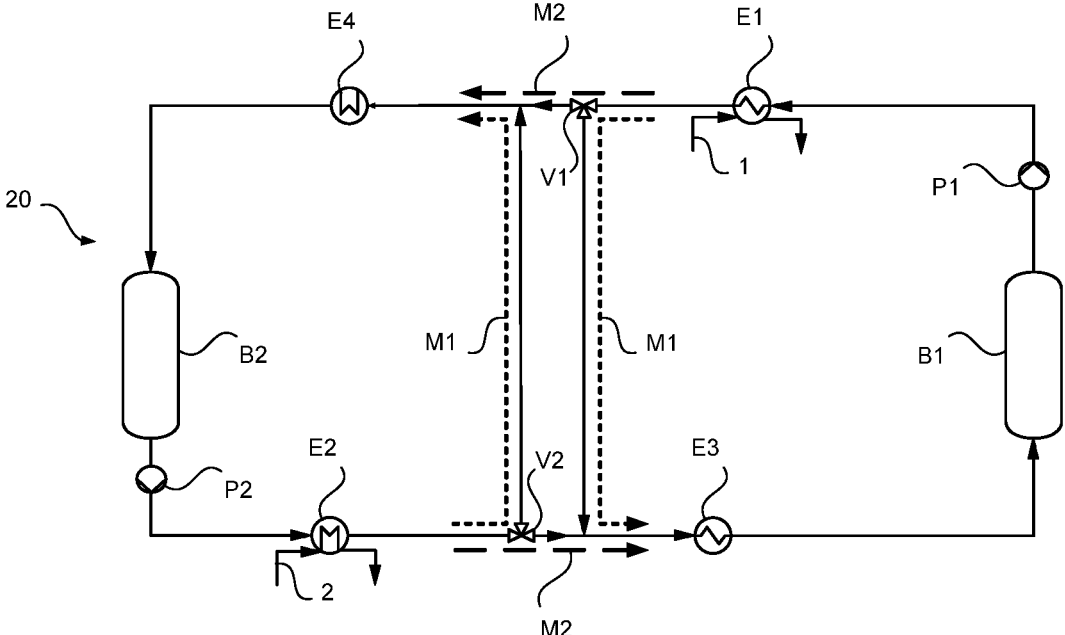
FIG. 2 illustrates a heat transfer arrangement according to an embodiment of the present invention in the form of a simplified process flow diagram.

FIG. 2 illustrates a heat transfer arrangement 20 according to an embodiment of the present invention in the form of a simplified process flow diagram. The heat transfer arrangement 20 comprises the first and second heat exchanger E1, E2 has already shown in FIG. 1 and explained in this connection. Gas streams 1 and 2 already shown in FIG. 1 are also shown in FIG. 2.

The first heat exchanger E1 and the second heat exchanger E2 are fluidly integrated into the heat transfer arrangement 20 operated using a heat transfer fluid, and the heat transfer arrangement 20 further comprises a heat transfer fluid heater E3, a first buffer vessel B1, a heat transfer fluid cooler E4 and a second buffer vessel B2. An outlet of the heat transfer fluid heater E3 is permanently fluidly connected with an inlet of the first buffer vessel B1, an outlet of the first buffer vessel B1 is permanently fluidly connected with an inlet of the first heat exchanger E1 via a first pump P1, an outlet of the heat transfer fluid cooler E4 is permanently fluidly connected with an inlet of the second buffer vessel B2, and an outlet of the second buffer vessel B2 is permanently fluidly connected with an inlet of the second heat exchanger E2.

In a first connection mode realized by three-way valves V1, V2, and as illustrated with dotted arrows M1, an outlet of the first heat exchanger E1 is temporarily fluidly connected to an inlet of the heat transfer fluid heater E3 while an outlet of the second heat exchanger E2 is temporarily fluidly connected to an inlet of the heat transfer fluid cooler E4. In a second connection mode realized by the three-way valves V1, V2, and as illustrated with dashed arrows M2, the outlet of the first heat exchanger E1 is temporarily fluidly connected to the inlet of the heat transfer fluid cooler E4 while an outlet of the second heat exchanger E2 is temporarily fluidly connected to an inlet of the heat transfer fluid heater E3.

Figure 3A:
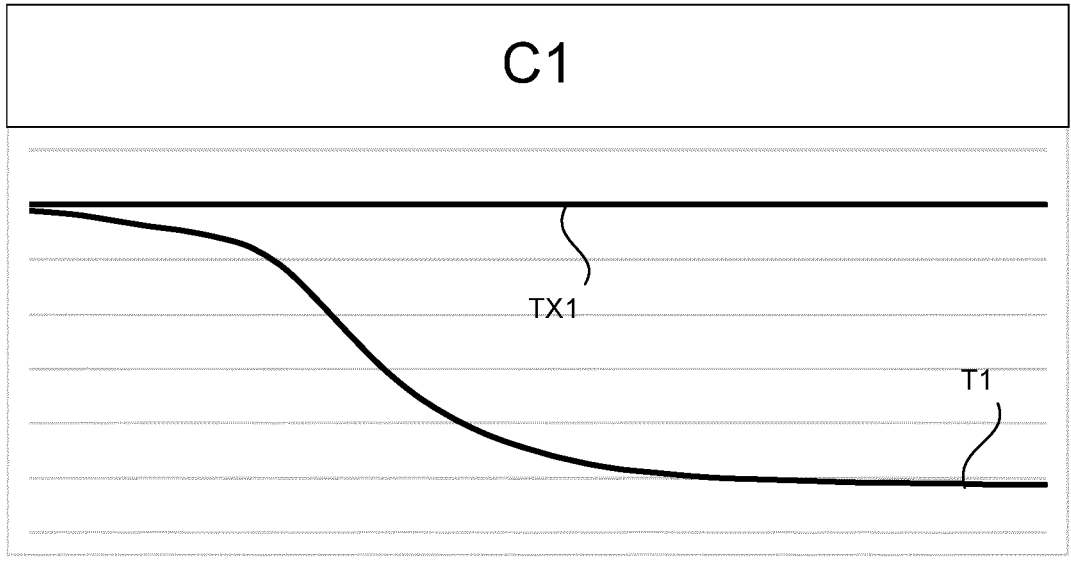
FIGS. 3A and 3B illustrate inlet temperatures to a first and a second heat exchanger in an embodiment of the present invention in the form of a diagram.
Figure 3B:
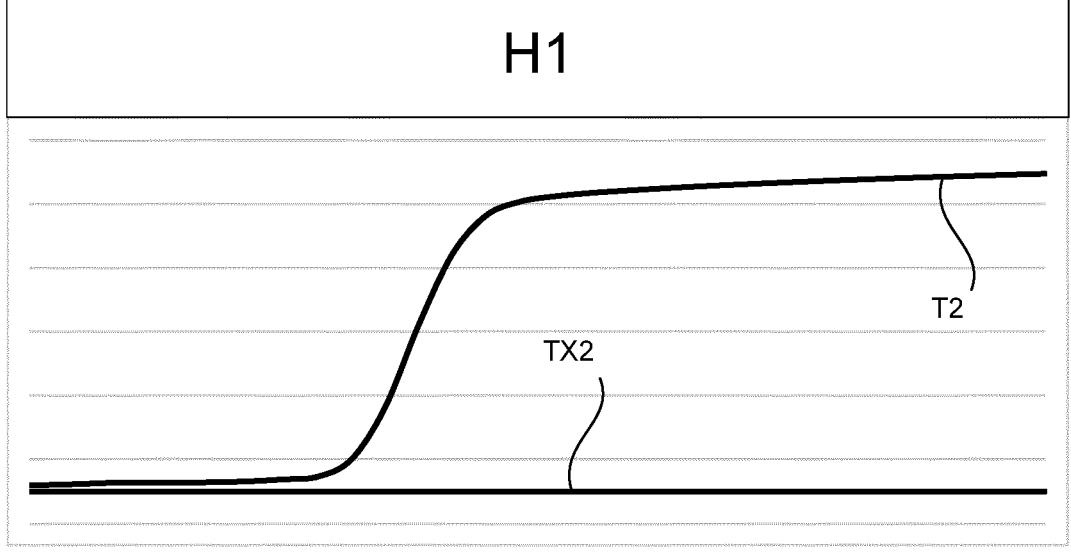

FIGS. 3A and 3B illustrates inlet temperatures T1 of the first gas stream 1 to the first heat exchanger E1 (FIG. 3A) and T2 of the second gas stream 2 to the second heat exchanger E2 (FIG. 3B) over time in a single operation cycle according to an embodiment of the present invention in the form of diagrams. Temperatures TX1 and TX2 of the heat transfer medium used in the first heat exchanger E1 (FIG. 3A) and the second heat exchanger E2 (FIG. 3B) are also illustrated over time.

As already mentioned before, and as further explained with reference to FIGS. 3A and 3B, the decision which connection mode illustrated in FIG. 2 is used depends, on the heat that is transferred in the first heat exchanger E1 and the second heat exchanger E2. In the early part of a temperature swing adsorption cycle, corresponding to a part of the diagrams of FIGS. 3A and 3B left of a dash-dotted line, the inlet temperatures T1, T2 to the first heat exchanger E1 and the second heat exchanger E2 are close to the outlet temperatures and not much heat has to be transferred. That is, because in the early part of the cooling mode, the gas leaving the adsorption unit C operated in the cooling mode, i.e. the fourth gas stream 4 used to form the first gas stream 1, is still hot such that not much further heat is needed to obtain the first temperature level. Also, in the early part of the heating step, the gas leaving the adsorption unit H operated in the heating mode in form of gas stream 2 is still cold, such not much further cooling is needed. Consequently, it is efficient to use the first connection mode. In the late part of a temperature swing adsorption phase as illustrated in the diagrams of FIGS. 3A and 3B right of a dash-dotted line, the situation changes, as explained above. That is, because the gas leaving the adsorption unit C operated in the cooling mode in form of gas stream 4, which is used to form the gas stream 1, becomes cold and the gas leaving the adsorption unit H operated in the heating mode in form of the gas stream 2 becomes hot. That is, the second connection mode is preferably selected.

Figure 4:
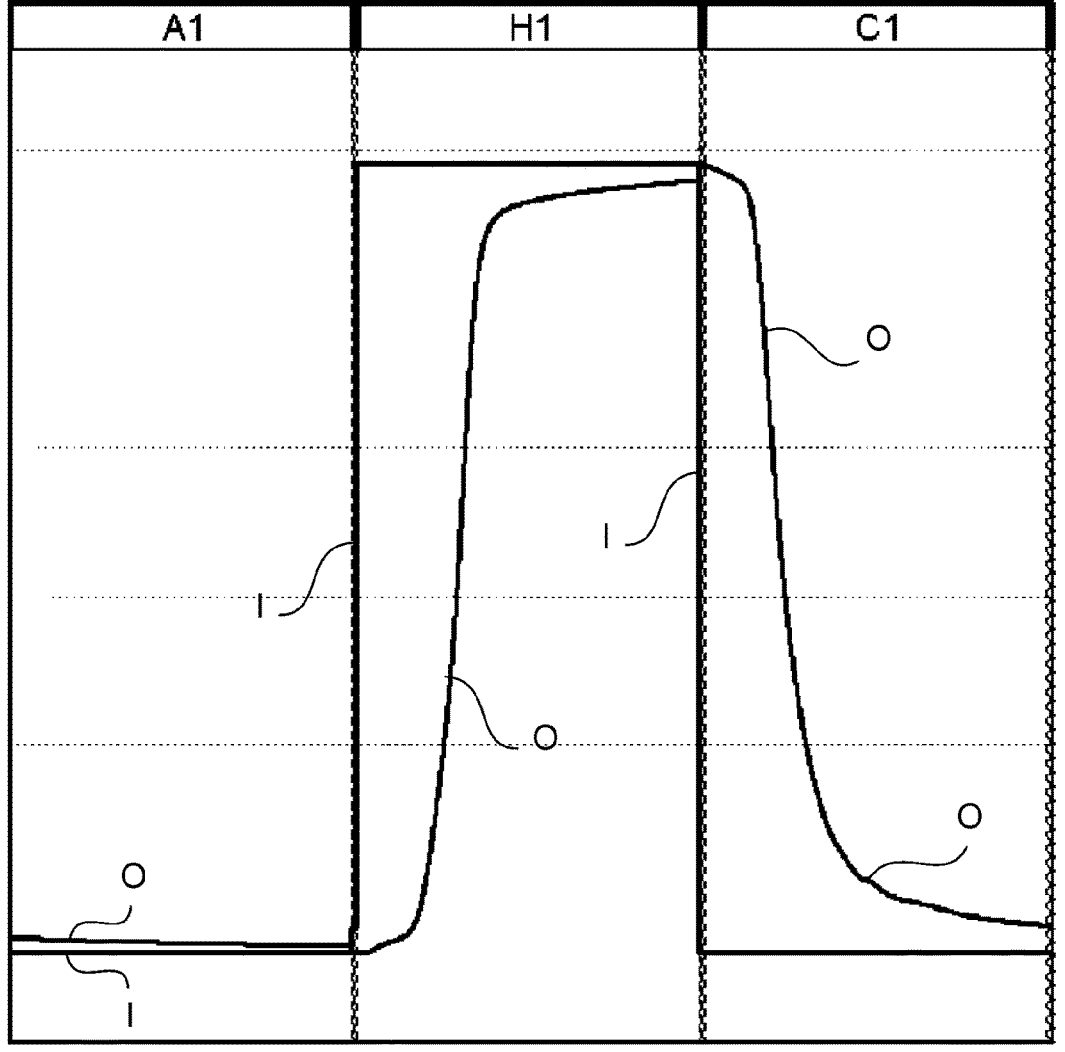
FIG. 4 illustrates the inlet and outlet temperatures of an adsorption vessel during the operation phases used in a method according an embodiment of the present invention in the form of a diagram.

FIG. 4 illustrates operation phases of an adsorbing vessel such as one of the adsorption vessels A, C, H according to FIG. 1 used in a method according an embodiment of the present invention in the form of a diagram. The operation phases or modes are indicated with A1, H1 and C1 (adsorption, heating, cooling) In FIG. 4, an inlet temperature to the adsorption vessel is indicated with I while an outlet temperature is indicated with O. As illustrated, the outlet temperature rises only after a significant time lapse in phase or mode H1 and likewise declines only after a significant time lapse in phase or mode C1.

The invention claimed is:

1. A gas treatment process in which a process arrangement comprising three process units is used, the gas treatment process comprising subsequently operating a different one of the three process units in a heating mode during a heating phase, the heating mode comprising heating a first gas stream to a first temperature level using a first heat exchanger, introducing the first gas stream at the first temperature level to the process unit which is operated in the heating mode, withdrawing a second gas stream from the process unit which is operated in the heating mode, and thereafter cooling the second gas stream to a second temperature level using a second heat exchanger, wherein the first heat exchanger and the second heat exchanger are operated in fluidic integration into a heat transfer arrangement operated using a heat transfer fluid, the heat transfer arrangement further comprising a heat transfer fluid heater, a first buffer vessel, a heat transfer fluid cooler and a second buffer vessel, an outlet of the heat transfer fluid heater being operated in permanent fluidic connection with an inlet of the first buffer vessel, an outlet of the first buffer vessel being operated in permanent fluidic connection with an inlet of the first heat exchanger, an outlet of the heat transfer fluid cooler being operated in permanent fluidic connection with an inlet of the second buffer vessel, and an outlet of the second buffer vessel being operated in permanent fluidic connection with an inlet of the second heat exchanger, in a first connection mode an outlet of the first heat exchanger is operated in temporary fluidic connection with an inlet of the heat transfer fluid heater while an outlet of the second heat exchanger is operated in temporary fluidic connection with an inlet of the heat transfer fluid cooler, and in a second connection mode the outlet of the first heat exchanger is operated in temporary fluidic connection with the inlet of the heat transfer fluid cooler while an outlet of the second heat exchanger is operated in temporary fluidic connection with an inlet of the heat transfer fluid heater.

2. The gas treatment process according to claim 1, wherein the heat transfer fluid is transferred from the first buffer vessel to the inlet of the first heat exchanger using a first pump and wherein the heat transfer fluid is transferred from the outlet of the second buffer vessel to the inlet of the second heat exchanger using a second pump.

3. The gas treatment process according to claim 1, wherein one of the first connection mode and the second connection mode is selected on the basis of a heat amount transferred in the first heat exchanger and the second heat exchanger by a control unit.

4. The gas treatment process according to claim 1, wherein while said one of the three process units is operated in the heating mode during the heating phase, a further one of the three process units is operated in a cooling mode during a cooling phase and a yet further one of the three process units is operated in an adsorption mode during an adsorption phase, each of the process units being cyclically operated in the heating mode, the cooling mode and the adsorption mode.

5. The gas treatment process according to claim 4, the cooling mode comprising introducing a third gas stream to the process unit operated in the cooling mode and withdrawing a fourth gas stream from the process unit operated in the cooling mode, and the adsorption mode comprising introducing a fifth gas stream to the process unit operated in the adsorption mode and withdrawing a sixth gas stream from the process unit operated in the adsorption mode.

6. The gas treatment process according to claim 5, the third gas stream being formed by using a part of a feed gas stream supplied to the gas treatment process, the first gas stream being formed by using at least a part of the fourth gas stream, the fifth gas stream being formed using a further part of the feed gas stream and at least a part of the second gas stream (2) cooled to the second temperature level, and a product gas stream withdrawn from the gas treatment process being formed using least a part of the sixth gas stream.

7. The gas treatment process according to claim 6, wherein a temperature swing adsorption arrangement is used as the process arrangement, the temperature swing adsorption arrangement comprising three adsorption vessels as the three process units, the at least three adsorption vessels each containing one or more adsorbents, the fifth gas stream comprises at least one undesired component and at least one desired component, the at least one undesired component being at least in part adsorbed to the adsorbent(s) in the adsorption vessel in the adsorption mode, such that the sixth gas stream is depleted in the at least one undesired component and enriched in the at least one desired component, in the heating mode the at least one undesired component is at least in part desorbed from the one or more adsorbents in the heating mode using the first gas stream as a heating gas stream, such that the second gas stream contains at least a part of the at least one undesired component, and in the cooling mode the third gas stream is used as a cooling gas stream with which the adsorbent contained in the adsorption vessel operated in the cooling mode is cooled.

8. The gas treatment process according to claim 4, wherein the first temperature level is a temperature level from 80 to 350° C. and the second temperature level is a temperature level from 0 to 50° C. or a temperature level above a freezing or hydrate formation point.

9. The gas treatment process according to claim 4, wherein during a first time period during the heating phase the first connection mode is selected and wherein during a second time period subsequent to the first time period during the heating phase, the second connection mode is selected.

10. The gas treatment process according to claim 9, wherein a switching from the first connection mode to the second connection mode is performed on the basis of a temperature level of the second gas stream withdrawn from the adsorption unit that is operated in the heating mode and/or a temperature level of the fourth gas stream withdrawn from the adsorption unit that is operated in the cooling mode.

11. The gas treatment process according to claim 9, wherein the switching from the first connection mode to the second connection mode is performed as soon as the temperature level of the second gas stream withdrawn from the adsorption unit that is operated in the heating mode is higher than the temperature level of the fourth gas stream withdrawn from the adsorption unit (C) that is operated in the cooling mode.

12. A process arrangement adapted to perform a gas treatment process, the process arrangement comprising a process unit, a first heat exchanger adapted to heat a first gas stream to a first temperature level, means adapted to introduce the first gas stream at the first temperature level to the process unit, means adapted to withdraw a second gas stream from the process unit, and a second heat exchanger adapted to cool the second gas stream (2) to a second temperature level wherein a heat transfer arrangement is provided into which the first heat exchanger and the second heat exchanger are fluidly integrated, the heat transfer arrangement being operable using a heat transfer fluid, the heat transfer arrangement further comprising a heat transfer fluid heater, a first buffer vessel, a heat transfer fluid cooler and a second buffer vessel, an outlet of the heat transfer fluid heater being permanently fluidly connected with an inlet of the first buffer vessel, an outlet of the first buffer vessel being permanently fluidly connected with an inlet of the first heat exchanger, an outlet of the heat transfer fluid cooler being permanently fluidly connected with an inlet of the second buffer vessel, and an outlet of the second buffer vessel being permanently fluidly connected with an inlet of the second heat exchanger, wherein means are provided to select either one of a first connection mode and a second connection mode, wherein in the first connection mode an outlet of the first heat exchanger is temporarily fluidly connected to an inlet of the heat transfer fluid heater while an outlet of the second heat exchanger is temporarily fluidly connected to an inlet of the heat transfer fluid cooler and wherein in the second connection mode the outlet of the first heat exchanger is temporarily fluidly connected to the inlet of the heat transfer fluid cooler while an outlet of the second heat exchanger is temporarily fluidly connected to an inlet of the heat transfer fluid heater.

* * * * *